Figures 1, 2:
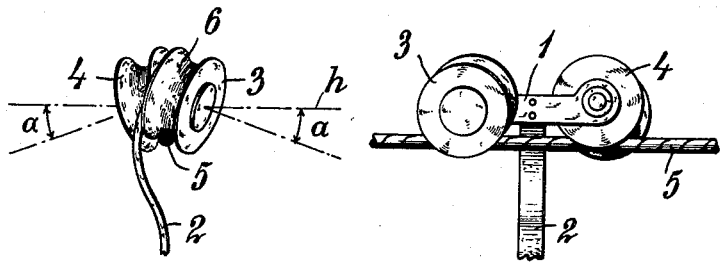

June 7, 1960

D. KROHN-HOLM 2,939,405

ARRANGEMENT IN OR RELATING TO SUPPORT
WHEELS FOR CABLE-WAY CARRIERS

Filed Nov. 18, 1957

INVENTOR.
Danckert Krohn-Holm
BY
*his attorney*

2,939,405
ARRANGEMENT IN OR RELATING TO SUPPORT WHEELS FOR CABLE-WAY CARRIERS

Danckert Krohn-Holm, Oscars Gate 13, Oslo, Norway

Filed Nov. 18, 1957, Ser. No. 697,095

3 Claims. (Cl. 105—148)

The present invention relates to support wheels for cable- or ropeway carriers, travelling crabs, telpher or the like. Previously known devices have been provided with one or more support wheels rotatably journaled on a suitable frame or car from which the load hangs.

The invention has for its object to provide a device which is formed so that the cable wheels, which support the transport device, cannot come off the cable or rope along which they roll. Further an engagement between the wheels and the cable or rope is obtained, which gives a substantially greater contact surface than known support wheel arrangements, whereby a substantial reduction in wear of the groove of the wheels as well as the cable or rope is obtained.

According to the invention, the above object is obtained by arranging at least two support wheels so that they are located with their axes of rotation forming an angle with a horizontal plane as well as with a plane perpendicular to the longitudinal axes of the cable or rope. The wheels, thus, will be given a somewhat twisted oblique position, having preferably about the same inclination in an outward direction in relation to the cable or rope and about the same twist in side direction.

According to a preferred embodiment, the groove section and the wheel location angles are adapted to the cable or rope in such a way that the contact between the wheels and cable or rope extends along a substantially straight line. By this arrangement according to the invention, maximum contact surface between wheels and cable or rope is obtained, and minimum wear occurs due to the fact that the load is transferred over a relatively great range.

According to a modified embodiment, the support wheels are arranged in groups, each of which consists of two wheels, the wheels in each group—as above described—being given a twisted oblique position. The inclination of the various groups may, however, be different. By such mounting, each wheel group will roll along the cable-way on a contact path differing from the other groups. The cable or rope will thus be very leniently loaded or subjected to wear during operation.

Figure 3:
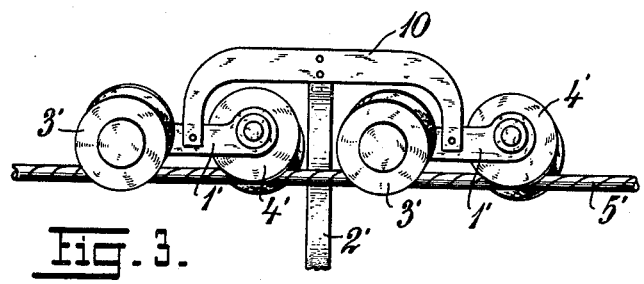
Figure 4:
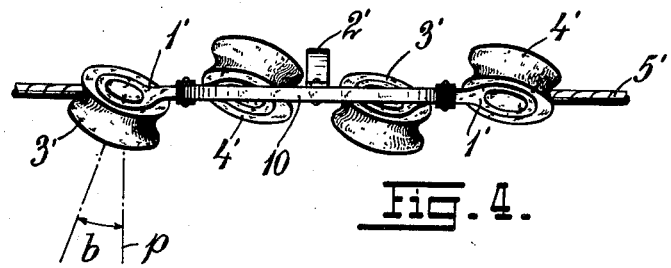

To have a better understanding of the invention, a further description is given below in connection with the embodiments shown in the drawing, wherein;

Fig. 1 shows a pair of support wheels according to the invention, as seen in side elevation, Fig. 2 shows the same pair of wheels as seen in end elevation in the direction of the cable or rope, Fig. 3 shows an embodiment comprising four support wheels arranged in two groups, as seen in side elevation, and Fig. 4 shows this arrangement looking down on the top.

The device, according to Figs. 1 and 2, consists of a cross bar 1, rigidly secured to the end of the hanging member 2 for the support of the load to be transported. At the end of the cross bar 1, are rotatably journaled the two support wheels 3 and 4. The wheels 3, 4 are provided with guiding grooves 6, sectioned in accordance with the cable or rope preferably with a hyperbolic form.

The wheels 3, 4 are placed in a twisted oblique or inclined position as clearly is seen from the drawing. The axes of rotation of the wheels thereby form an angle $a$ with a horizontal plane, the inclination being in direction outward, as shown. Further the wheels 3, 4 are twisted in the horizontal plane $h$, so that their axes of rotation form an angle B with a line $p$ normal to the cable or rope (Fig. 4). By this twisted oblique position the above mentioned advantages are just obtained, i.e. firstly, the cable or rope 5 will be surrounded by the grooved wheels over a distance of an angle substantially greater than for commonly known grooved wheels and, secondly, the contact between the cable or rope and the wheels 3, 4 will be extended over substantially greater contact surface than commonly known arrangements. In the example according to Fig. 2, the cable or rope 5 will be seen to be surrounded over about 180°. Such an arrangement, therefore, will secure against unintended jumping off of the wheels from the cable or rope, even when heavy oscillations occur as for example in wind athwart or other circumstances. The wheels 3, 4 can, of course be given a still greater inclination so that their encompassing the cable or rope is more than 180°.

When the surface of the groove 6 is adapted in relation to the dimension of the cable or rope 5, the contact therebetween may extend according to a substantially straight line whereby maximum contact surface between cable and wheels is obtained.

Figs. 3 and 4 show a somewhat modified embodiment, where the support wheels of the device are arranged in two groups 3' and 4', the wheels being journaled at the ends of the cross bars 1' which by means of a joke 10 are mutually connected and gives support to the hanging member 2' for the load. Each pair of support wheels 3', 4' is arranged with the wheels in the same twisted and inclined position as shown in Figs. 1 and 2. The two groups are symmetrically disposed and the device, according to Figs. 3 and 4, will give a further distribution of the pressure over greater surfaces while at the same time, jumping off is prevented.

If it should be desired to further reduce the wear of the cable or rope, the wheels of the groups may be given different inclination whereby they will roll along the cable or rope in different contact paths.

The invention is not restricted to the embodiments here described and disclosed. A series of modification of its structural details as well as its practical use are conceivable without falling outside the scope of the inventive idea. Thus, the invention is applicable to whatever relative movement between the cable, rope rail or the like and a wheel device in which the wheels are arranged in such a twisted oblique position as here defined.

I claim:

1. In an overhead conveyor assembly including an overhead cable and a carrier suspended from the cable; at least two support wheels for the carrier connected in spaced relationship along the longitudinal axis of the cable; each of said wheels being so positioned in travelling relation to the cable so that its axis of rotation forms an angle with a horizontal plane passing through the cable as well as with a plane passing through the cable perpendicular to the horizontal plane whereby said wheels are in an oblique twisted position relative to the cable and said wheels having the same outward inclination and twist in opposite directions in relation to the cable, and said wheels having peripheral grooves formed so that in the longitudinal inclination of the wheels to the longitudinal direction of the cable the grooves are in linear contact with the cable.

2. In an overhead conveyor assembly including an overhead cable and a carrier suspended therefrom; two sets of rotatable support wheels for the carrier, said sets being symmetrically arranged and connected in spaced relation along the longitudinal axis of the cable and each set including a pair of wheels connected in spaced relation along the longitudinal axis of the cable; each wheel of each set being so positioned in travelling relation to the cable that its axis of rotation forms an angle with a horizontal plane passing through the cable as well as a plane passing through the cable perpendicular to the horizontal plane whereby each wheel is in a twisted oblique position relative to the cable and the wheels of each set having the same outward inclination and twist in opposite directions in relation to the cable, and said wheels having peripheral grooves formed so that in the longitudinal inclination of the wheels to the longitudinal direction of the cable, the grooves are in linear contact with the cable.

3. In an overhead conveyor assembly including an overhead cable and a carrier suspended therefrom; two sets of rotatable support wheels for the carrier, said sets being symmetrically arranged and connected in spaced relation along the longitudinal axis of the cable and each set including a pair of wheels connected in spaced relation along the longitudinal axis of the cable; each wheel of each set being so positioned in travelling relation to the cable that its axis of rotation forms an angle with a horizontal plane passing through the cable as well as a plane passing through the cable perpendicular to the horizontal plane whereby each wheel is in a twisted oblique position relative to the cable and the wheels of each set having the same outward inclination and twist in opposite directions in relation to the cable, said wheel sets mutually being given different angles of inclination in relation to the horizontal plane and said wheels having peripheral grooves formed so that the longitudinal inclination of the wheels to the longitudinal direction of the cable, the grooves are in linear contact with the cable.

References Cited in the file of this patent

UNITED STATES PATENTS

| | | |
|---|---|---|
| 343,319 | Jenkin | June 8, 1886 |
| 358,584 | Vogel et al. | Mar. 1, 1887 |
| 783,920 | Zimmerman | Feb. 28, 1905 |
| 911,399 | Jenson | Feb. 2, 1909 |
| 1,749,381 | Huebsch | Mar. 4, 1930 |
| 2,529,954 | McCann | Nov. 14, 1950 |
| 2,842,393 | Lorig | July 8, 1958 |

FOREIGN PATENTS

| | | |
|---|---|---|
| 109,814 | Switzerland | Apr. 16, 1925 |